US008144672B2

(12) United States Patent
Pandey et al.

(10) Patent No.: US 8,144,672 B2
(45) Date of Patent: Mar. 27, 2012

(54) WIRELESS WIDE AREA BROADBAND COVERAGE IN A VEHICULAR AREA NETWORK (VAN)

(75) Inventors: Aparna Pandey, Chicago, IL (US); Christophe Janneteau, Bois d'Arcy (FR); George Popovich, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1123 days.

(21) Appl. No.: 11/680,394

(22) Filed: Feb. 28, 2007

(65) Prior Publication Data

US 2008/0205356 A1 Aug. 28, 2008

(51) Int. Cl.
*H04W 4/00* (2009.01)

(52) U.S. Cl. ............... 370/338; 455/552.1; 455/553.143; 455/435.1; 455/435.2; 455/99; 455/152.1; 455/345; 455/436; 455/437; 455/438; 455/439; 455/440; 455/441; 455/442; 455/443; 370/310; 370/331

(58) Field of Classification Search .................. 370/338, 370/331; 455/553.1, 552.1, 99, 152.1, 345, 455/436–444, 435.1, 435.2
See application file for complete search history.

(56) References Cited

U.S. PATENT DOCUMENTS

| 7,489,659 | B2 * | 2/2009 | Siorpaes et al. | ............... 370/331 |
| 2004/0246964 | A1 * | 12/2004 | Grimminger et al. | ........ 370/392 |
| 2005/0232286 | A1 | 10/2005 | Lee | |
| 2006/0182061 | A1 * | 8/2006 | Naghian | ........................ 370/331 |
| 2007/0011278 | A1 | 1/2007 | Nou | |
| 2007/0069030 | A1 * | 3/2007 | Sauerwein et al. | ....... 235/462.46 |
| 2007/0110017 | A1 * | 5/2007 | Fulknier et al. | ................ 370/338 |
| 2007/0206537 | A1 * | 9/2007 | Cam-Winget et al. | ......... 370/331 |
| 2007/0249347 | A1 * | 10/2007 | Saifullah et al. | .............. 455/436 |
| 2008/0076422 | A1 * | 3/2008 | Lin | ................ 455/436 |
| 2008/0089305 | A1 * | 4/2008 | Yao et al. | ....................... 370/342 |

FOREIGN PATENT DOCUMENTS

| WO | WO2006046896 A | 5/2006 |
| WO | WO 2006046896 A1 * | 5/2006 |

OTHER PUBLICATIONS

Office Action for Related U.S. Appl. No. 11/680,428 Dated Oct. 2, 2009.
PCT International Search Report for Related U.S. Appl. No. 11/680,428.

* cited by examiner

*Primary Examiner* — Kamran Afshar
*Assistant Examiner* — Edward Zhang
(74) *Attorney, Agent, or Firm* — Randi L. Karpinia; Anthony P. Curtis; Daniel R. Bestor

(57) ABSTRACT

The disclosure relates to techniques and technologies for providing mobile wireless broadband coverage. In one implementation, Wireless Wide Area Broadband (WWAB) network elements are provided in a Vehicular Area Network (VAN) that also includes a Mobile Network Controller (MNC). The WWAB network elements in the VAN include at least one WWAB base station (BS). A mobility protocol tunnel is provided between a Mobility Management Server (MMS) and the MNC to make mobility of the WWAB network elements in the VAN transparent to the WWAB network elements in the fixed infrastructure. The WWAB BS and the MNC can allow a WWAB-enabled mobile station (MS) to connect to WWAB network elements in the fixed infrastructure.

21 Claims, 7 Drawing Sheets

WIRELESS WIDE AREA BROADBAND COVERAGE IN A VEHICULAR AREA NETWORK (VAN)

CROSS-REFERENCE TO RELATED APPLICATIONS

This application is related to currently pending U.S. patent application Ser. No. 11/680,428, also entitled "WIRELESS WIDE AREA BROADBAND COVERAGE IN A VEHICULAR AREA NETWORK (VAN)," by the same inventors and filed in the USPTO on Feb. 28, 2007.

FIELD OF THE INVENTION

The present invention relates generally to wireless communications and more particularly to wireless Vehicular Area Networks (VANs).

BACKGROUND

Incident scene and event management communication solutions are designed to serve incidents and events such as fires, natural disaster scenes, special events such as sporting events and conventions, emergency scenes and accident scenes. Communications at incident scenes or events can be challenging for a number of reasons. The complexity of a particular incident scene or event varies on a case-by-case basis. In many cases, the incident scene or event will involve hundreds of personnel who need to coordinate their efforts, and who need access to shared communications resources and tools for group communication. Personnel at such incident scenes and events require a comprehensive set of instant, on-site communication tools which preferably combine easily deployable applications, devices and networks that rapidly give personnel information they need. At many incident scenes or events, such communications solutions are not readily available through fixed on-site infrastructure. Accordingly, personnel at such incident scenes and events require communication networks which can provide access on-demand, anywhere, at any time, with or without the presence of back-end fixed communication infrastructure. Such communication networks should also provide the ability to scale as the incident or event develops.

Therefore, incident scene management, event management, and disaster recovery operations require on-demand, portable wireless communication solutions, which may work to either extend existing coverage to remote areas or to provide coverage in places where the fixed infrastructure does not exist.

BRIEF DESCRIPTION OF THE FIGURES

The accompanying figures, which together with the detailed description below are incorporated in and form part of the specification, serve to further illustrate various embodiments and to explain various principles and advantages all in accordance with the present invention.

Figure 1:
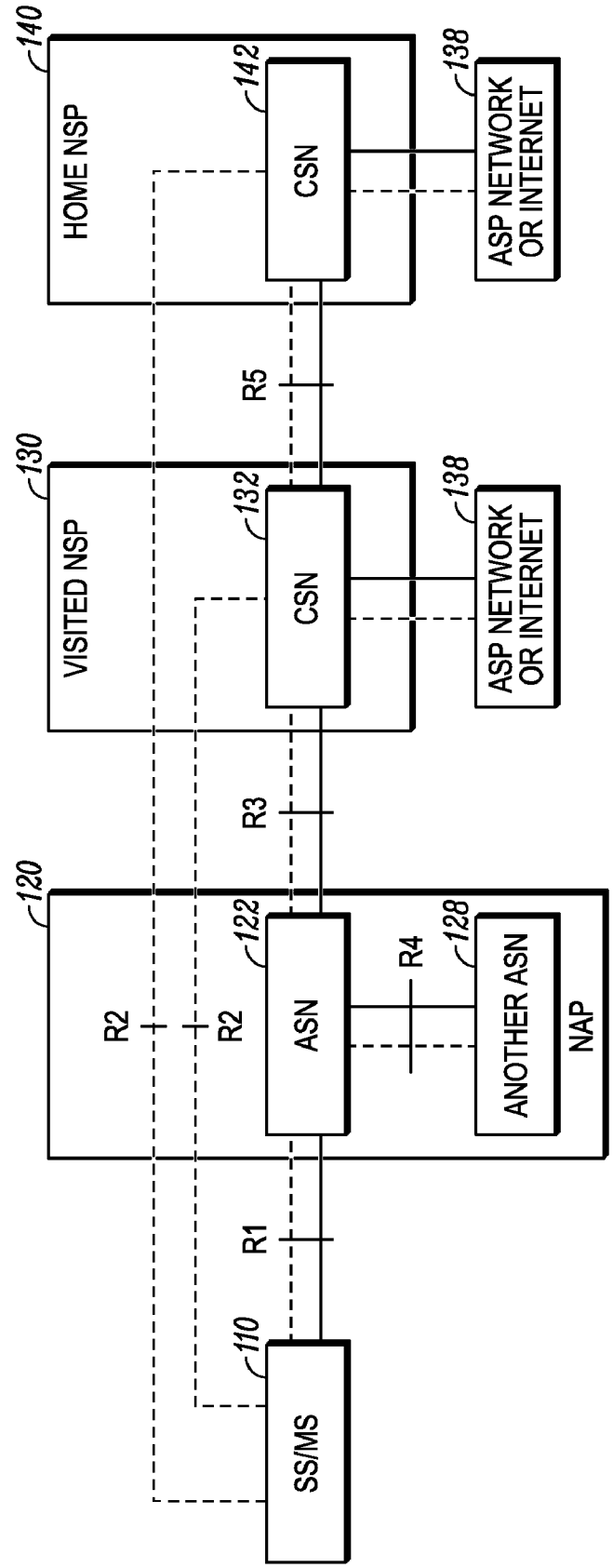
FIG. 1 is a block diagram of a Worldwide Interoperability for Microwave Access (WiMAX) network reference model.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to providing wireless broadband coverage via a Vehicular Area Network (VAN) and supporting mobility of wireless broadband network elements in a VAN. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for providing wireless broadband coverage via a Vehicular Area Network (VAN) and supporting mobility of wireless broadband network elements in a VAN, as described herein. The non-processor circuits may include, but are not limited to, a radio receiver, a radio transmitter, signal drivers, clock circuits, power source circuits, and user input devices. As such, these functions may be interpreted as steps of a method for providing wireless broadband coverage via a Vehicular Area Network (VAN) and supporting mobility of wireless broadband network elements in a VAN. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Overview

This "Overview" is provided to introduce a selection of concepts in a simplified form that are further described below. This "Overview" is not intended to identify key features or essential features of the claimed subject matter, nor is it intended to limit the scope of the claimed subject matter.

As used herein, the term "Wireless Wide Area Broadband network (WWAB)" refers to any wireless wide area broadband network including wireless broadband metropolitan area networks (MANs) such as Worldwide Interoperability for Microwave Access (WiMAX) based networks, Wireless Broadband (WiBRO) Internet system based networks, other networks based on IEEE 802.16 standard, networks based on IEEE 802.20 standard, current and future generations of cellular networks such as those based on Time Division Multiple Access (TDMA-GSM), Code Division Multiple Access (CDMA), Wideband CDMA, Orthogonal Frequency Division Multiplexing (OFDM) and Orthogonal Frequency Division Multiple Access (OFDMA) and the like.

WiMAX is defined as Worldwide Interoperability for Microwave Access by the WiMAX Forum, formed in June 2001 to promote conformance and interoperability of the IEEE 802.16 standard, officially known as Wireless Metropolitan Area Network (MAN). WiMAX networks are comprised of an IEEE 802.16-based radio link layer specified by the Institute of Electrical and Electronic Engineers (IEEE) and an all-Internet Protocol (IP)-based broadband wireless network architecture specified by the Network working group of the WiMAX forum. See "WiMAX End-to-End Network Systems Architecture, Stage 2: Architecture, Tenets, Reference Model and Reference Points", DRAFT, 15 December 2005. WiMAX systems are being designed to enable the delivery of last mile wireless broadband access as an alternative to cable and Digital subscriber line (DSL) technologies. WiMAX systems are targeted for deployment both in licensed and unlicensed frequency bands. WiMAX also aims at supporting both Internet Protocol version 4 (IPv4) and Internet Protocol version 6 (IPv6) sessions.

As used herein, the term "WiMAX network element" refers to a WiMAX network node within the Access Service Network (ASN) such as the Base Station (BS) and Access Service Network Gateway (ASN-GW), and those in the Connectivity Service Network (CSN) such as the Connectivity Service Network Home Agent (CSN-HA).

As used herein, the term WiBRO refers to a Wireless Broadband Internet system specified by the Telecommunications Technologies Association of Korea (TTAK) and includes a subset of IEEE 802.16-based standards as well as an IP-based backbone. The WiBRO standards are described in a set of documents titled "INFORMATION ON BROADBAND WIRELESS ACCESS SERVICE IN KOREA," Document 9B/72-E, International Telecommunication Union-Radiocommunication Study Groups, dated Sep. 14, 2004. The WiBRO standards are available at http://www.wibro.or.kr/documents.htm or at http://www.wibro.or.kr/standards.htm.

As used herein, the term "WiBRO network element" refers to a WiBRO network node such as a Radio Access Station (RAS) (that provides similar functionality as a WiMAX BS), an Access Control Router (ACR) (that provides similar functionality as a WiMAX ASN-GW), and a Home Agent (HA) (that provides HA functionality for mobility protocols such as Mobile IP).

In conventional Wireless Wide Area Broadband network (WWAB), network elements are deployed as part of fixed infrastructure (e.g., in the fixed part of the network in which nodes are interconnected with wireline or fixed wireless connections). For example, in conventional WiMAX networks, WiMAX network elements such as the WiMAX Base Station (BS), Access Service Network Gateway (ASN-GW) and the Connectivity Service Network Home Agent (CSN-HA) are deployed as part of fixed infrastructure (e.g., in the fixed part of the network in which nodes are interconnected with wireline or fixed wireless connections). The current WiMAX architecture provided by IEEE 802.16 and the WiMAX forum is not designed to handle mobility of its network elements.

Embodiments of the present invention provide techniques for implementing Wireless Wide Area Broadband (WWAB) networks, such as IEEE 802.16-based WiMAX broadband wireless networks, in a Vehicular Area Network (VAN). As used herein the term "Vehicular Area Network (VAN)" refers to an IP network, typically deployed in a vehicle, and capable of changing its point of attachment to the fixed IP infrastructure (e.g., the Internet). The VAN typically includes a Mobile Network Controller (MNC) managing the mobility of the VAN in a transparent manner to IP nodes inside the VAN. Further, the VAN could be mobile (where the VAN can be moving but it maintains its connectivity to the fixed IP infrastructure while managing its changing points of attachment), nomadic (where the VAN can be moved from one location to another without maintaining its connectivity to the fixed IP infrastructure during the motion. However, at each location, it may acquire a new point of attachment to the fixed IP infrastructure, if needed and restore connectivity to the fixed IP infrastructure.) or the VAN could be fixed.

For example, in accordance with some embodiments of the present invention, WWAB network elements can be distributed between fixed infrastructure and a VAN to enable WWAB coverage at a location where WWAB coverage through WWAB network elements in a fixed infrastructure is not available. For example, at least one WWAB network element, such as a WWAB base station, can be deployed in a VAN scenario. Such deployments are not supported by conventional WWAB networks since the WWAB network element(s) in a VAN may not be associated with a fixed IP address. To solve this problem, a mobility protocol tunnel, such as a Mobile Virtual Private Network (MVPN) tunnel (or other type of mobility tunnel) is provided between the WWAB network elements in the fixed infrastructure and those in the VAN to make mobility transparent to other relevant WWAB network elements in the fixed infrastructure.

Embodiments of the present invention can provide WWAB coverage via a Vehicular Area Network (VAN) when one or more WWAB network elements in a fixed infrastructure are not reachable. WWAB network elements are provided in a Vehicular Area Network (VAN) when coverage of a WWAB network is not available through WWAB network elements in a fixed infrastructure. The WWAB network elements in the VAN comprise at least one WWAB base station (BS). The WWAB BS and a Mobile Network Controller (MNC) in the VAN can allow a WWAB-enabled mobile station (MS) to connect to WWAB network elements in the fixed infrastructure through a Mobility Management Server provided in the fixed network to enable transparent mobility of WWAB network elements in the VAN to the rest of the WWAB network elements in the fixed infrastructure. As used herein, the term "Mobility Management Server" refers to a communication node that typically resides in the fixed infrastructure and manages the mobility of one or more Mobile Node (MN) or Mobile Network Controller (MNC). The MMS allows continuation of MN/MNC communications despite a change of MN/MNC's point of attachment to the network, for instance, during a handover. The MMS typically acts as an endpoint for a mobility tunnel coupled to the MN or MNC. The other end point of the mobility tunnel can be the MN or MNC itself, or another node such as an access router coupled to the MN/MNC. In one embodiment, the Mobility Management Server is a Mobile Virtual Private Network (MVPN) Server.

The disclosed embodiments support mobility of WWAB network elements in a VAN by introducing an intermediate or "outside" tunnel to make such mobility transparent (e.g., hiding the mobility of the WWAB network element in the VAN) to other relevant WWAB network elements in the fixed infrastructure. The mobility tunnel can be any type of mobility tunnel including, but not limited to, a Mobile Virtual Private Network (MVPN) tunnel including a Mobile IP tunnel and a VPN tunnel or any other IP mobility protocol tunnel such as Mobile IP (MIP), Proxy Mobile IP (PMIP), Hierarchical Mobile IP (HMIP), NETwork-based Local Mobility Management (NETLMM) protocol, Host Identity Protocol (HIP). For example, in one implementation, an Internet Protocol (IP) mobility protocol tunnel can be provided between the fixed infrastructure and the VAN to make mobility of the WWAB network elements in the VAN transparent to those in the fixed infrastructure. In one embodiment, when the Mobility Management Server is a Mobile Virtual Private Network (MVPN) Server, network element mobility can be made transparent by introducing a Mobile Virtual Private Network (MVPN) tunnel (i.e. Mobile IP+VPN) between WWAB network elements in the fixed infrastructure and WWAB network elements in the VAN.

These techniques can provide coverage or WWAB connectivity to users of Commercial-Off-The-Shelf (COTS) WWAB-enabled mobile stations (MSs) or nodes in a geographical area where the WWAB network elements in the fixed infrastructure are unavailable or not reachable. For example, these techniques can provide coverage or WWAB connectivity in situations where coverage provided by fixed WWAB infrastructure is not available at the geographical area. These techniques can be particularly useful, for example, at an incident scene, a disaster recovery area, a trade show, a sporting event, or any other location where multiple end-users have gathered and WWAB connectivity is not available.

Some embodiments provide indirect reachability to WWAB network elements in the fixed infrastructure via a Radio Access Network (RAN). This is referred to as the connected mode. Other embodiments provide autonomous mode coverage where WWAB network elements in the fixed infrastructure are not reachable at all. Autonomous mode corresponds to a configuration where an infrastructure connection is not available, for instance, due to a lack of RAN coverage at the VAN's location. During autonomous mode, WWAB network elements in the VAN can not communicate with or reach WWAB network elements in the fixed infrastructure. Some embodiments also support bypass mode i.e., when the packet traversal via only the VAN is more efficient than packet traversal to and from the fixed infrastructure. In such a case, the bypass mode is used for packet traversal via the WWAB network elements in the VAN even when the WWAB network elements in the fixed infrastructure are reachable.

To illustrate how embodiments of the present invention can be implemented, FIGS. 1-7 will describe how embodiments of the present invention can be implemented in the context of a WiMAX network. While the following description will describe an implementation of the present invention in which the WWAB network is a WiMAX network, those skilled in the art will appreciate that the principles of present invention can also be applied in an analogous manner to other types of WWABs. For example, the embodiments of the present invention can also be implemented in an analogous manner in the WiBRO network by replacing WiMAX network elements with their corresponding WiBRO network elements or nodes such as Radio Access Station (RAS), Access Control Router (ACR), and Home Agent (HA). As such, the claims should not be interpreted as being limited to a WiMAX network, but are to be interpreted as applying to all types of Wireless Wide Area Broadband networks (WWABs).

Figure 2:
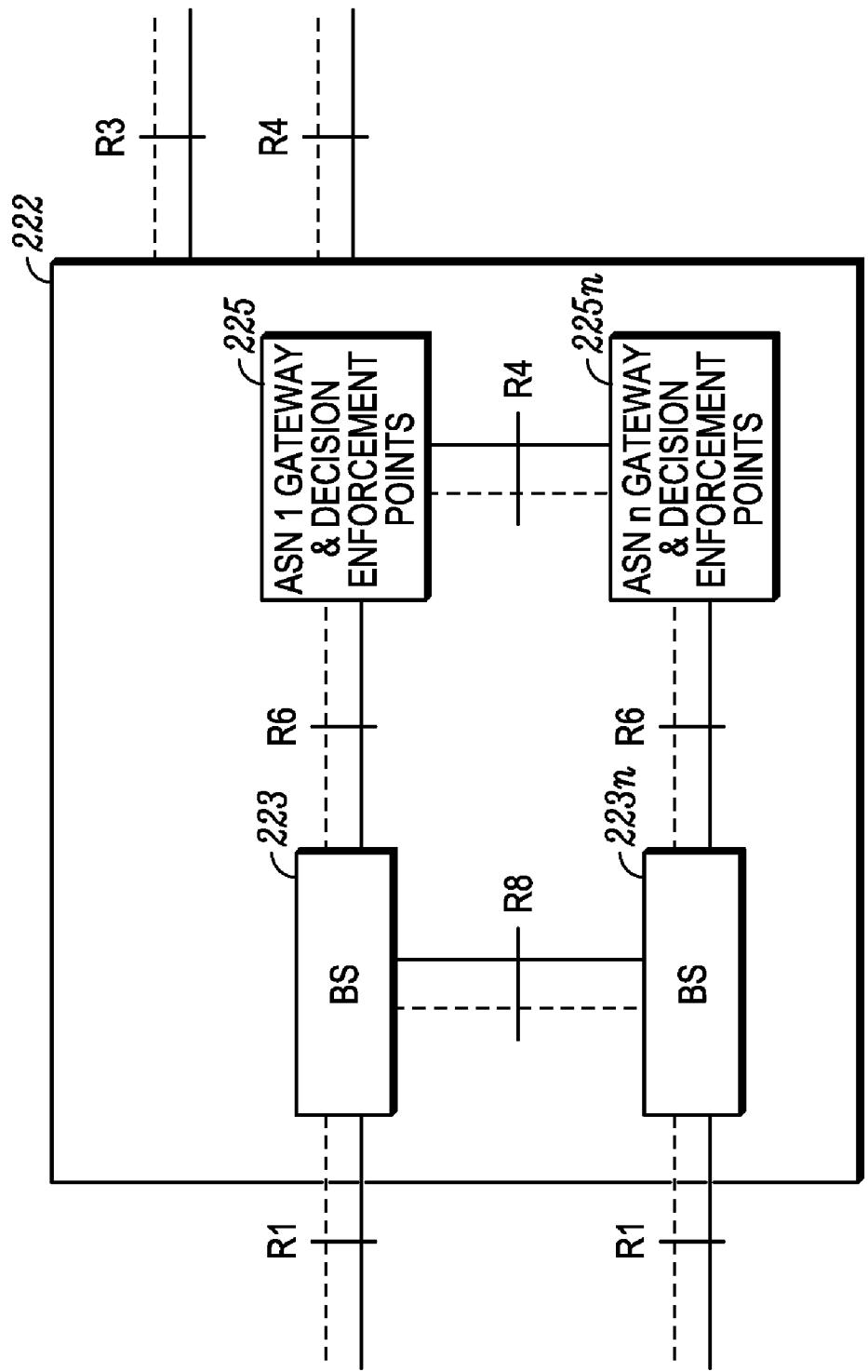
FIG. 2 is a block diagram of an Access Service Network (ASN) reference model.

Prior to describing exemplary WiMAX embodiments of the invention, a brief overview of the WiMAX system architecture will be provided with reference to FIGS. 1 and 2. The WiMAX architecture framework aims at accommodating different usage models including fixed, nomadic, and mobile access scenarios. The mobile usage model provides broadband wireless Internet access for mobile equipment with full handover support. In the mobile usage model, the WiMAX air interface relies on IEEE 802.16e standards capable of accommodating up to vehicular-speed mobility. IP mobility techniques are used to handle mobility of Mobile Stations (MS) between IEEE 802.16e access points deployed in different IP subnets of the WiMAX system. This overview focuses on the mobile usage model.

WiMAX Architecture and WiMAX Network Reference Model

FIG. 1 is a block diagram of a WiMAX network reference model 100 which is a logical representation of the network architecture.

The WiMAX network reference model 100 identifies functional entities comprising a Subscriber Station or Mobile Station (SS/MS) 100, a Network Access Provider's (NAP) network 120 comprising Access Service Network (ASN) 122, 128, a Visited Network Service Provider's network 130 comprising a Visited Connectivity Service Network (CSN) 132 coupled to an Application Service Provider (ASP) Network 138 or the Internet 138, a Home Network Service Provider's network 140 comprising a Home Connectivity Service Network (CSN) 142 coupled to an ASP Network 138 or the Internet 138 and reference points R1-R5 over which interoperability is achieved between the functional entities. The Home CSN 142 refers to the CSN operated by the Home NSP 140 of the MS 110.

The ASN 122 can be seen as the radio access network part of the WiMAX system. The ASN 122 is defined as the set of network functions needed to provide radio access to a WiMAX mobile station 110. These network functions include: 802.16e-based connectivity with mobile station 110, network discovery and selection of an appropriate CSN 132, 142 that MS 110 accesses WiMAX services from, relay functionality for establishing L3 connectivity with a MS 110 (i.e., IP address allocation), Radio Resource Management, and intra-ASN mobility. The ASN 122 reference model is described below with reference to FIG. 2.

The CSN 132, 142 can be seen as the core network part of the WiMAX system. The CSN 132, 142 is defined as the set of network functions that provide IP connectivity services to the MS 110. The CSN 132, 142 provides the following functions: MS IP address allocation, Internet access, Authentication, Authorization and Accounting (AAA) server/proxy, policy and Admission Control based on user subscription profiles, WiMAX subscriber billing and inter-operator settlement, inter-CSN tunneling for roaming, and inter-ASN mobility. The CSN 132, 142 comprises network elements such as routers, Authentication, Authorization and Accounting (AAA) servers/proxies, user databases, Mobile IP Home Agent(s), Domain Name Service (DNS) servers, and the like. It will be appreciated that IEEE 802.16 operational aspects are transparent to the CSN 132, 142.

The ASN 122 and CSN 132, 142 can be owned and managed by different network providers; respectively called Network Access Provider (NAP) 120 and Network Service Provider (NSP) 130, 140. Thus, based on business agreement between operators, one ASN 122 can provide access to multiple CSNs; in which case reachability of these CSNs will be announced by the ASN 122 on its air interface to help MS in the ASN/CSN selection process. Similarly, a CSN can interact with more than one ASN 122. In addition, a roaming agreement can exist between NSPs 130, 140, allowing an MS 110 managed by its Home NSP 140 to get services for a Visited NSP 130.

As shown in FIG. 1, the WiMAX network reference model 100 defines a number of reference points. Reference point R1 comprises the protocols and procedures between MS 110 and ASN 122 as per the 802.16e air interface specifications. R2 comprises protocols and procedure between MS 110 and CSN 132, 142 associated with authentication, service authorization and IP host configuration management. Especially, the authentication part of R2 runs between the MS 110 and the Home CSN 142, but may require partial processing of this procedure in the ASN 122 and Visited CSN 132 (e.g. AAA client/proxy). Reference point R3 comprises the set of control plane protocols between the ASN 122 and the CSN to support AAA, policy enforcement and mobility management capabilities. Reference point R3 also encompasses the bearer plane methods (e.g. tunnelling) to transfer user data between ASN 122 and CSN. Reference point R4 comprises the set of control and bearer plane protocols that coordinate MS 110 mobility between ASNs and ASN-GWs. R5 comprises the set of control plane and bearer plane protocols for interworking between the home CSN 142 and the visited CSN 132.

FIG. 2 is a block diagram of an Access Service Network (ASN) 222 reference model. An ASN 222 comprises one or more Base Stations (BS) 223, 223n, one or more ASN Gateways (ASN-GW) 225, 225n and reference points R4, R6 (which comprises the protocols and procedures between BS 223 and ASN-GW 225), R8 (which comprises the protocols and procedures between BS 223 and BS 223n). Although not shown, multiple BSs may be connected to the same ASN-GW. The ASN-GW 225 hosts specific functions such as a Mobile IP Foreign Agent or Dynamic Host Configuration Protocol (DHCP) relay. The BS 223, in addition of supporting the IEEE 802.16e air interface, can also provide specific IP networking functions such as Network Access Server/Authentication, Authorization and Accounting (NAS/AAA) client functions or Proxy Mobile IP client functions.

Figure 3:
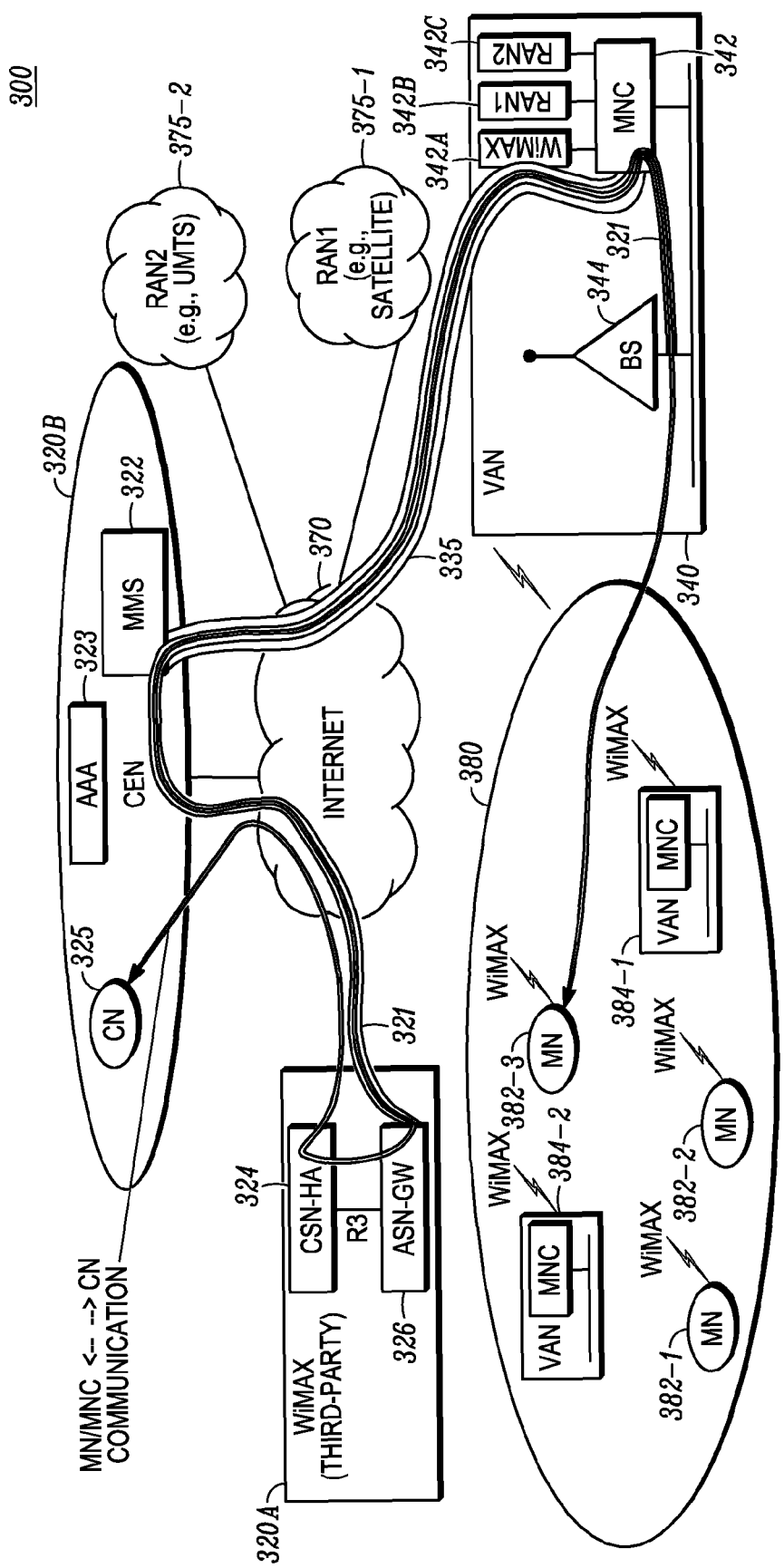
FIG. 3 is a block diagram of an exemplary communication network in accordance with some embodiments of the invention.
Figure 4:
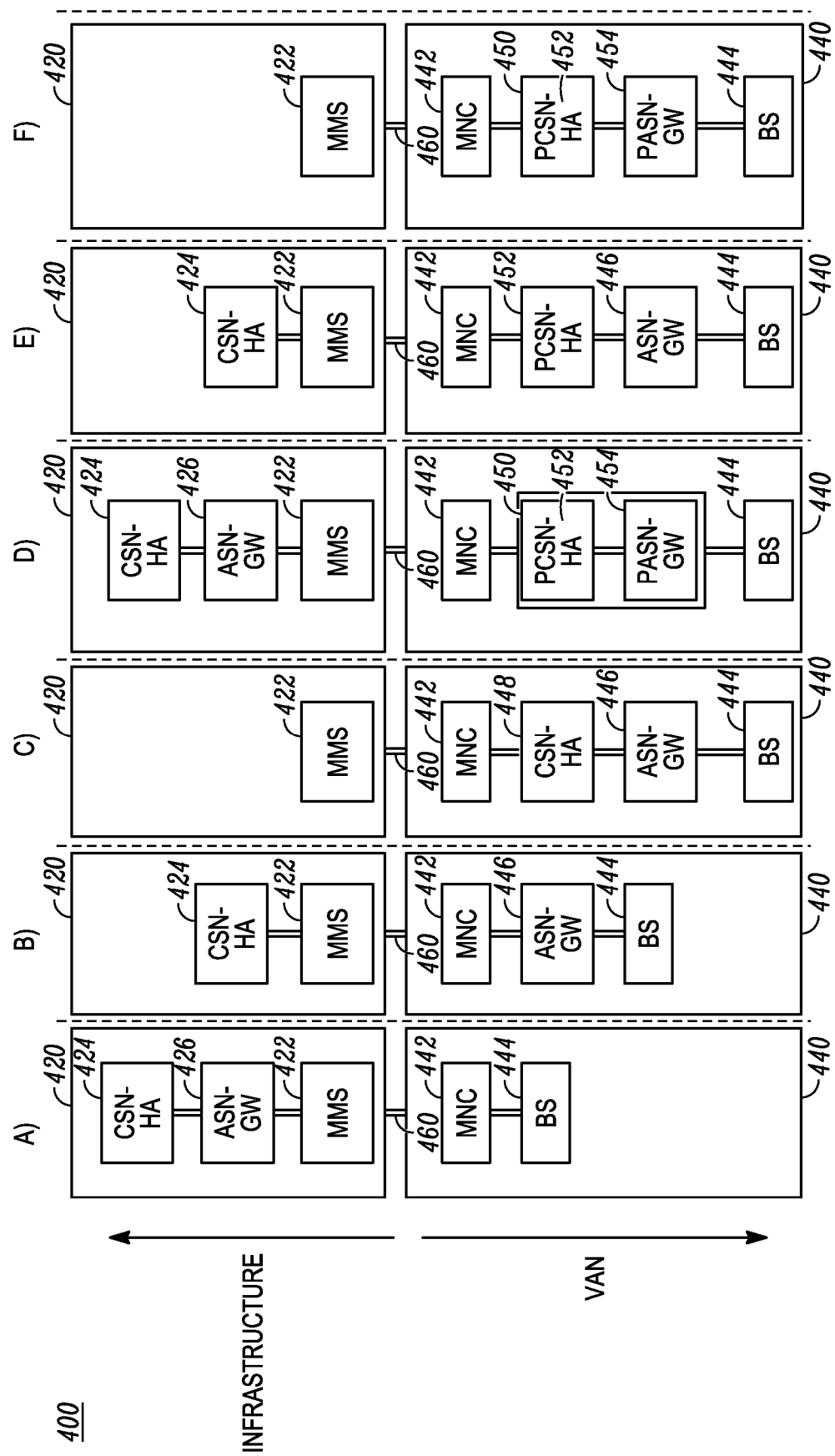
FIGS. 4A-4F are block diagrams illustrating various embodiments of WiMAX in a Vehicular Area Network (VAN) communication networks (A-F) for providing WiMAX coverage via a VAN in accordance with some embodiments of the invention.

FIG. 3 is a block diagram of an exemplary communication network 300 in accordance with some embodiments of the invention.

The communication network 300 comprises a third-party WiMAX network elements in the fixed infrastructure 320A, a Customer Enterprise Network (CEN) in the fixed infrastructure 320B, a VAN 340 including an MNC 342 and WiMAX BS 344, an Internet Protocol (IP) network 370 (e.g., the Internet), a first Radio Access Network (RAN1) 375-1 (e.g., a satellite radio access network), a second Radio Access Network (RAN2) 375-1 (e.g., a cellular radio access network) and a group 380 of WiMAX-enabled nodes 382 and/or WiMAX-enabled VANs 384, neither having a direct access to WiMAX network elements in the fixed infrastructure (referred to hereafter as an "event 380" for purposes of simplicity). The event 380 can be, for example, an incident scene or other location where WiMAX-enabled equipment is present, but lacks direct access to WiMAX network elements in the fixed infrastructure (e.g., because of the lack of WiMAX coverage provided by fixed WiMAX infrastructure at the location). In this particular example, event 380 is shown as comprising a plurality of WiMAX-enabled nodes 382 and a plurality of WiMAX enabled VANs 384 which lack direct access to WiMAX network elements in the fixed infrastructure. The nodes 382 and VANs 384 are capable of communicating with the VAN 340 over a WiMAX interface to access external networks such as the Internet 370, RAN1 375-1, RAN-2 375-2, and CEN 320B. The VANs 384 include MNCs that are equipped with a WiMAX interface or WiMAX mobile station functionality for connecting to a WiMAX network (such as the WiMAX coverage provided by the VAN 340).

The CEN in the fixed infrastructure 320B comprises: a Mobility Management Server (MMS) 322, such as a Mobile VPN (MVPN) server, an AAA server 323, a correspondent node (CN) 325, which communicates with WiMAX-enabled nodes such as Mobile Nodes (MNs) 382. The Mobility Management Server (MMS) 322 is described above. In another embodiment of the invention, the WiMAX-enabled nodes such as Mobile Node 382-3 may communicate with any node in fixed infrastructure or in a wireless network. In the exemplary embodiment shown in FIG. 3, the WiMAX fixed network elements 320A and the Mobility Management Server (MMS) 322 are on different networks. In another embodiment, the CEN 320B and the WiMAX network elements in the fixed infrastructure 320A may reside in the same network. The WiMAX network elements 324, 326 in the fixed infrastructure 320A include a CSN-HA 324 coupled to a ASN-GW 326 via a R3 reference point.

In accordance with embodiments of the invention, at least some of the WiMAX network elements are placed in the VAN 340. In the particular embodiment shown in FIG. 3, the WiMAX network elements in the VAN 340 minimally comprise a WiMAX BS 344 deployed inside a VAN 340 (e.g., directly connected to the intra-vehicular subnet behind the MNC 342 with or without other entities also in the VAN 340). The WiMAX BS 344 is directly connected to the IP network inside the VAN that is serviced by the MNC 342 (e.g., the intra-vehicular subnet behind the MNC 342), with the MNC 342 realizing the interconnection between any node attached to this intra-VAN IP network and the fixed infrastructure. Therefore, although FIG. 3 indicates that the VAN 340 includes WiMAX BS 344, in other embodiments described below with reference to FIG. 4, the same techniques can be applied, for example, if other WiMAX network elements, such as an ASN-gateway (ASN-GW) and/or a CSN-Home Agent (CSN-HA) are also deployed in the VAN 340. Moreover, while one WiMAX BS 344 is shown in FIG. 3, it will be appreciated that the same techniques can be extended to include multiple WiMAX BSs (operating in different spectrums to avoid interference) in the VAN 340 as well. Because these WiMAX network elements (shown in FIG. 3 as the WiMAX BS 344) are in a VAN 340 these network elements 344 may not be associated with a fixed IP address.

In the embodiment shown, the MNC 342 includes a WiMAX interface 342A, a RAN1 interface 342B and a RAN2 interface 342C. In this embodiment, the MNC 342 connects the VAN 340 to the CEN 320B via a wireless link on either of the three interfaces 342A-C. In another embodiment, the MNC 342 includes at least one interface to connect to the fixed infrastructure via a RAN (which could be any Radio Access Network like IEEE 802.11, cellular, WiMAX and the like). In another embodiment, the MNC 342 connects to the fixed infrastructure via wired network. However, in some embodiments explained below, no connection to the fixed infrastructure is required.

In accordance with embodiments of the invention, an outside tunnel 335 is provided between the MNC 342 in the VAN 340 and the MMS 322 so that the WiMAX network elements 344 in the VAN 340 can connect to the WiMAX network elements in the fixed infrastructure 320 A. In one implementation, the outside tunnel 335 can be a Mobile VPN (MVPN) tunnel including a Mobile IP tunnel and a VPN tunnel or any other IP mobility protocol tunnel such as Proxy Mobile IP (PMIP), Hierarchical Mobile IP (HMIP), NETwork-based Local Mobility Management (NETLMM) protocol, Host Identity Protocol (HIP), and the like.

The outside tunnel 335 can make mobility of the WiMAX network elements 344 in the VAN 340 transparent to both WiMAX network elements in the fixed infrastructure 320A, and equipment in the CEN 320B. In one embodiment, the outside tunnel 335 may comprise a MVPN tunnel. One benefit of using the MVPN tunnel is the additional security provided by the VPN when the MNC 342 attaches to the fixed infrastructure over a public RAN 375. In one implementation of the embodiment shown in FIG. 3, a mobile virtual private network (MVPN) tunnel 335 couples the VAN 340 to the CEN 320B. The following description illustrates the use of MVPN tunneling 335 to hide mobility of WiMAX network element 344. In this particular embodiment, the Mobility Management Server (MMS) 322 comprises a MVPN Server 322, and the MVPN Server 322 in the fixed infrastructure (i.e., CEN 320B) and the Mobile Network Controller (MNC) 342 in the VAN 340 act as the two ends of the IP mobility protocol tunnel 335. This tunnel hides the mobility of the VAN 340 from the fixed infrastructure 320A, 320B.

It should be noted that while in this embodiment the only WiMAX network element in the VAN 340 is the WiMAX BS 344, the same techniques can be applied even if the ASN Gateway (ASN-GW) was in the VAN 340 (e.g., the ASN-GW mobility would be hidden from the CSN-HA in the fixed infrastructure via the outside tunnel). In addition, mobility over the R3 interface (ASN⇆CSN), R4 interface (ASN⇆ASN), R5 interface (CSN⇆CSN) R6 interface (BS⇆ASN-GW) and R8 interface (BS⇆BS) can be hidden via the same or similar techniques. Moreover, while ASN⇆ASN and CSN⇆CSN mobility are not explicitly described herein, such an extension should be obvious to those skilled in the art.

The WiMAX network elements 324, 326 in the fixed infrastructure 320A may be coupled to the WIMAX network elements 344 in the VAN 340 by an optional point-to-point (PtP) VPN tunnel 321 that provides a WiMAX reference point between the WIMAX network elements 344 in the VAN 340 and the WIMAX network elements in the fixed infrastructure 320A. The point-to-point (PtP) VPN tunnel 321 is optional and can be used, for example, when the WiMAX network elements 344 in the VAN 340 are separated from the WiMAX network elements 324, 326 in the fixed infrastructure 320A by a potentially unsecure network such as the Internet 370 in FIG. 3. In such cases, the PtP VPN tunnel 321 realizes the WiMAX R6 reference point between the ASN-GW 326 and the WiMAX BS 344 in the VAN 340. In other embodiments, the PtP VPN tunnel 321 may not be used, which means that packets between the ASN-GW 326 and the WiMAX BS 344 (for the case of the R6 reference point) would be routed natively (as per regular IP routing) instead of through a VPN tunnel 321. For instance, in scenarios where all the WiMAX network elements in the fixed infrastructure are deployed inside the CEN 320B (thus reachable from the VAN 340 without the need to cross the Internet 370), then the PtP VPN tunnel 321 would not be needed.

FIGS. 4A-4F are block diagrams 400 illustrating various embodiments of WiMAX in a VAN communication networks (A-F) for providing WiMAX coverage via a VAN in accordance with some embodiments of the invention. The blocks in FIGS. 4A-4F represent logical entities which may or may not be physically collocated as long as the demarcation between the infrastructure 420 and the VAN 440 is maintained. Different elements of the infrastructure could in turn be owned by different entities such as the Customer Enterprise Network (CEN)/Network Access Provider (NAP)/Network Service Provider (NSP). In each of the FIGS. 4A-4F, various entities in the VAN 440 and the infrastructure 420 are communicatively coupled via connections or links. The links are logical links that can traverse wireless and/or wireline domains. As such, the links connecting the various entities in the VAN 440 and the infrastructure 420 may or may not be direct physical connections, and the various entities may be linked to one another via other nodes. In each of the FIGS. 4A-4F, the Mobile Network Controller (MNC) 442 connects the VAN 440 to the infrastructure 420 via link 460 which could be either a wireless link on any Radio Access Network (RAN) such as IEEE 802.11, cellular, or a wired link. It should be noted, however, that some of the embodiments do not require any connection to the infrastructure 420. In the examples below (except during autonomous mode) the infrastructure connection 460 that connects the MNC 442 of the VAN 440 to the fixed infrastructure 420 may be via a RAN that may or may not be an IEEE 802.16-based RAN (e.g., not necessarily WiMAX) or a wired network. As noted above, "autonomous mode" corresponds to a configuration where the infrastructure connection 460 is not available, for instance, due to a lack of RAN coverage at the VAN's location. During autonomous mode, WiMAX network elements in the VAN 440 cannot communicate with/reach WiMAX network elements in the infrastructure 420.

In the embodiment shown in FIG. 4A, the communication network comprises infrastructure 420 comprising a Mobility Management Server (MMS) 422, a Connectivity Service Network Home Agent (CSN-HA) 424 and an Access Service Network Gateway (ASN-GW) 426, and a VAN 440 comprising MNC 442 and a WiMAX Base Station (BS) 444. In this embodiment the VAN 440 has the WiMAX BS 444 and the MNC 442, and the remainder of the WiMAX network resides in the fixed infrastructure 420. This embodiment represents the simplest mode of operation; it does not support autonomous mode and requires fixed infrastructure connectivity at all times. This mode does not require any changes to the WiMAX network elements except that the WiMAX BS 444 should be small enough to be installed in a vehicular scenario. Further, it leverages an existing complete WiMAX network (CSN+ASN).

In the embodiment shown in FIG. 4B, the communication network comprises infrastructure 420 comprising a Mobility Management Server (MMS) 422, and a Connectivity Service Network Home Agent (CSN-HA) 424, and a VAN 440 comprising MNC 442, a WiMAX Base Station (BS) 444, and an Access Service Network Gateway (ASN-GW) 446. In this embodiment, only the CSN-HA 424 resides in the fixed infrastructure 420. This mode of operation leverages connection to an existing WiMAX CSN but lack of a roaming agreement with a NAP for accessing an ASN-GW in the fixed infrastructure 420 (not shown). This ASN-in-the-VAN feature can be enabled on-demand. The fixed infrastructure 420 can manage multiple simultaneous incident scenes independently through their own ASNs and not via a common ASN. The ASN-GW 446 in the VAN 440 is more effective from a routing perspective in cases when the fixed infrastructure 420 has an ASN which is topologically far from the VAN 440. However, now two major WiMAX network elements must be supported in the vehicle. Further, this mode does not support autonomous mode and requires fixed infrastructure 420 connectivity at all times.

In the embodiment shown in FIG. 4C, the communication network comprises infrastructure 420 comprising a Mobility Management Server (MMS) 422, and a VAN 440 comprising MNC 442, a WiMAX Base Station (BS) 444, an Access Service Network Gateway (ASN-GW) 446, and Connectivity Service Network Home Agent (CSN-HA) 448. In this embodiment, the WiMAX network is completely contained in the VAN 440 (e.g., three major WiMAX network elements are supported in the vehicle). There is no need to support any WiMAX components in the fixed infrastructure 420. This scenario is well-suited for incident-scene networks encompassing various wireless RAN technologies in the VAN 440, without the need for permanent RAN-specific capabilities in the fixed infrastructure 420. The fixed infrastructure 420 can manage multiple simultaneous incident scenes independently through their own independent WiMAX networks. This configuration is most effective from a routing perspective since all the WiMAX-related signaling is handled within the VAN 440. In addition, this embodiment supports the autonomous mode (e.g., can operate without a connection 460 to the fixed infrastructure 420) and bypass mode. Notice that even though a connection to the fixed infrastructure 420 is shown, it need not be operational to support autonomous mode and bypass mode for this embodiment.

In some embodiments described below, two functional or logical entities are provided which are referred to herein as a Proxy Connectivity Service Network (CSN)-Home Agent (HA) (PCSN-HA) and a Proxy Access Service Network (ASN)-Gateway (GW) (PASN-GW) which are lightweight CSN-HA and ASN-GW entities, respectively. These lightweight entities reside in the VAN and provide proxy functionality for CSN-HA and ASN-GW, respectively. The PCSN-HA and the PASN-GW maintain the minimal functionality/signaling framework required to interoperate with WiMAX Mobile Stations while omitting the unnecessary complexity associated with their heavyweight counterparts such as those that reside in the fixed infrastructure. For example these entities need not support the handoff function if the configuration only includes a single BS. These entities are useful when their heavyweight counterparts are not available or for bypass mode (i.e., when the packet traversal via only the VAN is more efficient than packet traversal to and from the fixed infrastructure). As mentioned earlier, these entities are logical entities and may be collocated with the BS or the MNC or with each other.

In the embodiment shown in FIG. 4D, the communication network comprises infrastructure 420 elements comprising a Mobility Management Server (MMS) 422, a Connectivity Service Network Home Agent (CSN-HA) 424, and an Access Service Network Gateway (ASN-GW) 426, and a VAN 440 comprising MNC 442, a WiMAX Base Station (BS) 444, a Proxy Module 450 comprising a Proxy Connectivity Service Network Home Agent (PCSN-HA) 452 and a Proxy Access Service Network Gateway (ASN-GW) 454. This embodiment is similar to the one shown in FIG. 4A with the addition of the lightweight PCSN-HA 452 and PASN-GW 454 in the VAN 440. These entities are activated when the connection to the Mobility Management Server (MMS) 422 in the infrastructure 420 is lost, or when the connection to one of the WiMAX network elements (i.e., CSN-HA 424 or ASN-GW 426) is lost, or when the source/destination pair are attached to the same VAN 440, or when bypass mode is required for efficiency. Thus, the additional elements PCSN-HA 452 and PASN-GW 454 in this embodiment allow autonomous mode, bypass mode and connected mode to be supported.

In the embodiment shown in FIG. 4E, the communication network comprises infrastructure 420 elements comprising a Mobility Management Server (MMS) 422 and a Connectivity Service Network Home Agent (CSN-HA) 424, and a VAN 440 comprising MNC 442, a WiMAX Base Station (BS) 444, an Access Service Network Gateway (ASN-GW) 446, and a Proxy Connectivity Service Network Home Agent (PCSN-HA) 452. This embodiment is similar to the one shown in FIG. 4B with the addition of the lightweight PCSN-HA 452 in the VAN 440. The PCSN-HA 452 is activated when the connection to the Mobility Management Server (MMS) 422 in the infrastructure 420 is lost, or when the connection the CSN-HA 424 is lost, or when the source/destination pair are attached to the same VAN 440, or when bypass mode is required for efficiency.

Thus, the additional element PCSN-HA 452 in this embodiment allows autonomous mode, bypass mode and connected mode to be supported.

In the embodiment shown in FIG. 4F, the communication network comprises infrastructure 420 elements comprising a Mobility Management Server (MMS) 422, and a VAN 440 comprising MNC 442, a WiMAX Base Station (BS) 444, and a Proxy Module 450 comprising a Proxy Connectivity Service Network Home Agent (PCSN-HA) 452 and a Proxy Access Service Network Gateway (ASN-GW) 454. This embodiment is similar to the one shown in FIG. 4C except that lightweight PCSN-HA 452 and PASN-GW 454 are in the VAN 440. These lightweight entities are simpler to implement and support since they include only the minimal functionality required for an incident scene and to support COTS WiMAX MSs. This embodiment supports the autonomous mode (e.g., can operate without a connection 460 to the fixed infrastructure 420) and bypass mode. Even though a connection to the fixed infrastructure 420 is shown, it need not be operational to support autonomous mode and bypass mode for this embodiment.

According to some embodiments described below, techniques are provided for initializing WiMAX in a VAN (in connected mode or in autonomous mode).

Figure 5:
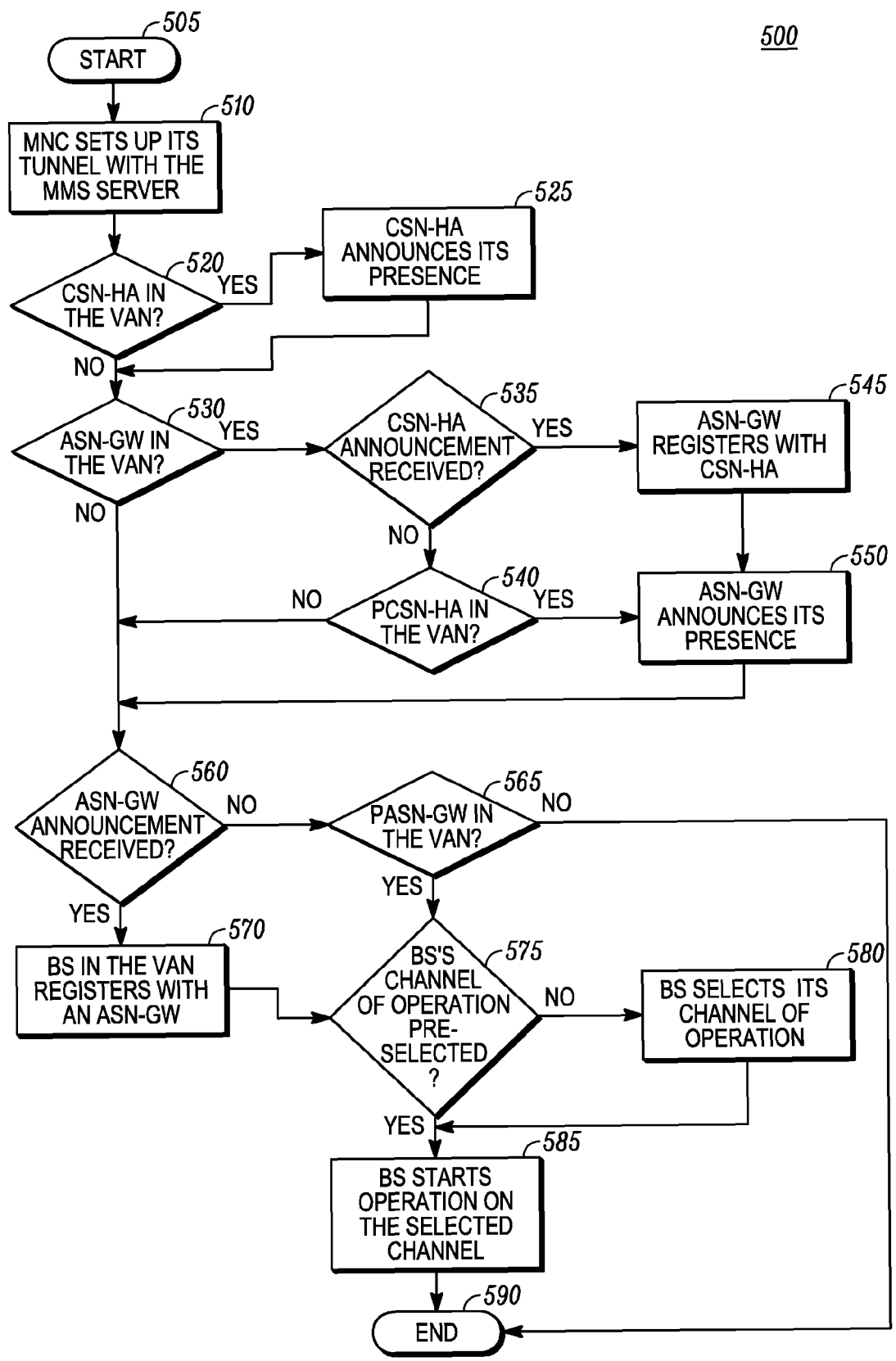
FIG. 5 is a flowchart showing an exemplary method for initializing WiMAX in a VAN in the connected mode in accordance with some embodiments of the invention.

FIG. 5 is a flowchart showing an exemplary method 500 implemented in the VAN 440 for initializing WiMAX network in a VAN 440 in connected mode in accordance with some embodiments of the invention. Initialization includes announcements from upstream network elements announcing their presence to downstream network elements and registration/attachment from downstream network elements to upstream network elements as a means to exchange their presence information and other relevant system parameters. In the embodiment shown, both announcements and registrations/attachment will require exchange of messages. In another embodiment this information can be pre-configured on one or more network elements. It is assumed that the lightweight PCSN-HA 452 and PASN-GW 454 do not require explicit registration/attachment by a down stream WiMAX network element. Note that the initialization follows a top-down approach since the WiMAX BS 444 can support COTS WiMAX MSs only if it has access to the rest of the WiMAX network elements at the backend. A similar method (not shown) can be applied for initialization of this WiMAX network in the autonomous mode. In such a case, an internal VAN 440 announcement declaring lack of access to the infrastructure mode can trigger this initialization.

The method 500 starts at step 505, and at step 510 the MNC 442 sets up a tunnel with the Mobility Management Server (MMS) 422. At step 520, the method 500 determines if there is a CSN-HA 448 in the VAN. If there is a CSN-HA 448 in the VAN, the CSN-HA 448 announces its presence to other WiMAX network elements in the VAN 440 such as to ASN-GW 446 if present in the VAN, and the method 500 proceeds to step 530. If there is not a CSN-HA 448 in the VAN, the method 500 proceeds to step 530 where the method 500 determines whether there is a ASN-GW 446 in the VAN.

If there is not an ASN-GW 446 in the VAN, the method 500 proceeds to step 560 where the WiMAX BS 444 determines whether an ASN-GW announcement has been received. If there is an ASN-GW 446 in the VAN, the method 500 proceeds to step 535 where the ASN-GW 446 determines whether a CSN-HA announcement has been received. If a CSN-HA announcement has been received, the method 500 proceeds to step 545 where the ASN-GW 446 registers with the CSN-HA 448. The method 500 then proceeds to step 550 where the ASN-GW 446 announces its presence to other WiMAX network elements in the VAN 440 such as to WiMAX BS 444 if present in the VAN, and the method 500 proceeds to step 560. If a CSN-HA announcement has not been received, the method 500 proceeds to step 540 where the ASN-GW 446 determines whether there is a PCSN-HA 452 in the VAN. If the ASN-GW 446 determines that there is a PCSN-HA 452 in the VAN, the method 500 proceeds to step 550 where the ASN-GW 446 announces its presence to other WiMAX network elements in the VAN 440 such as to WiMAX BS 444 if present in the VAN 440 and the method 500 proceeds to step 560 where the WiMAX BS 444 determines whether an ASN-GW announcement has been received. If the ASN-GW 446 determines that there is not a PCSN-HA 452 in the VAN, the method 500 proceeds to step 560 where the WiMAX BS 444 determines whether an ASN-GW announcement has been received.

If an ASN-GW announcement has been received at step 560, the method 500 proceeds to step 570 where the WiMAX BS 444 in the VAN 440 registers with an ASN-GW 446. The method 500 then proceeds to step 575 where the WiMAX BS 444 determines whether the channel of operation of the WiMAX BS 444 is pre-selected.

If an ASN-GW announcement has not been received at step 560, the method 500 proceeds to step 565 where the WiMAX BS 444 determines whether there is a PASN-GW 454 in the VAN. If there is not a PASN-GW 454 in the VAN, then the method 500 ends at step 590. If there is a PASN-GW 454 in the VAN, then the method 500 proceeds to step 575 where the WiMAX BS 444 determines whether the channel of operation of the WiMAX BS 444 is pre-selected.

If the WiMAX BS 444 determines that the channel of operation of the WiMAX BS 444 is pre-selected, then the method 500 proceeds to step 585 where the WiMAX BS 444 starts operation on the selected channel. The method 500 then ends at step 590.

If the WiMAX BS 444 determines that the channel of operation of the WiMAX BS 444 is not pre-selected, then the method 500 proceeds to step 580 where the WiMAX BS 444 selects its channel of operation. The method 500 then proceeds to step 585 where the WiMAX BS 444 starts operation on the selected channel. The method 500 then ends at step 590.

According to some embodiments described below, techniques are provided to support autonomous mode and bypass mode in a VAN along with transition from connected mode and autonomous mode and vice-versa. According to other embodiments, techniques are also provided for handling transitions between the connected and the autonomous modes.

Figure 6:
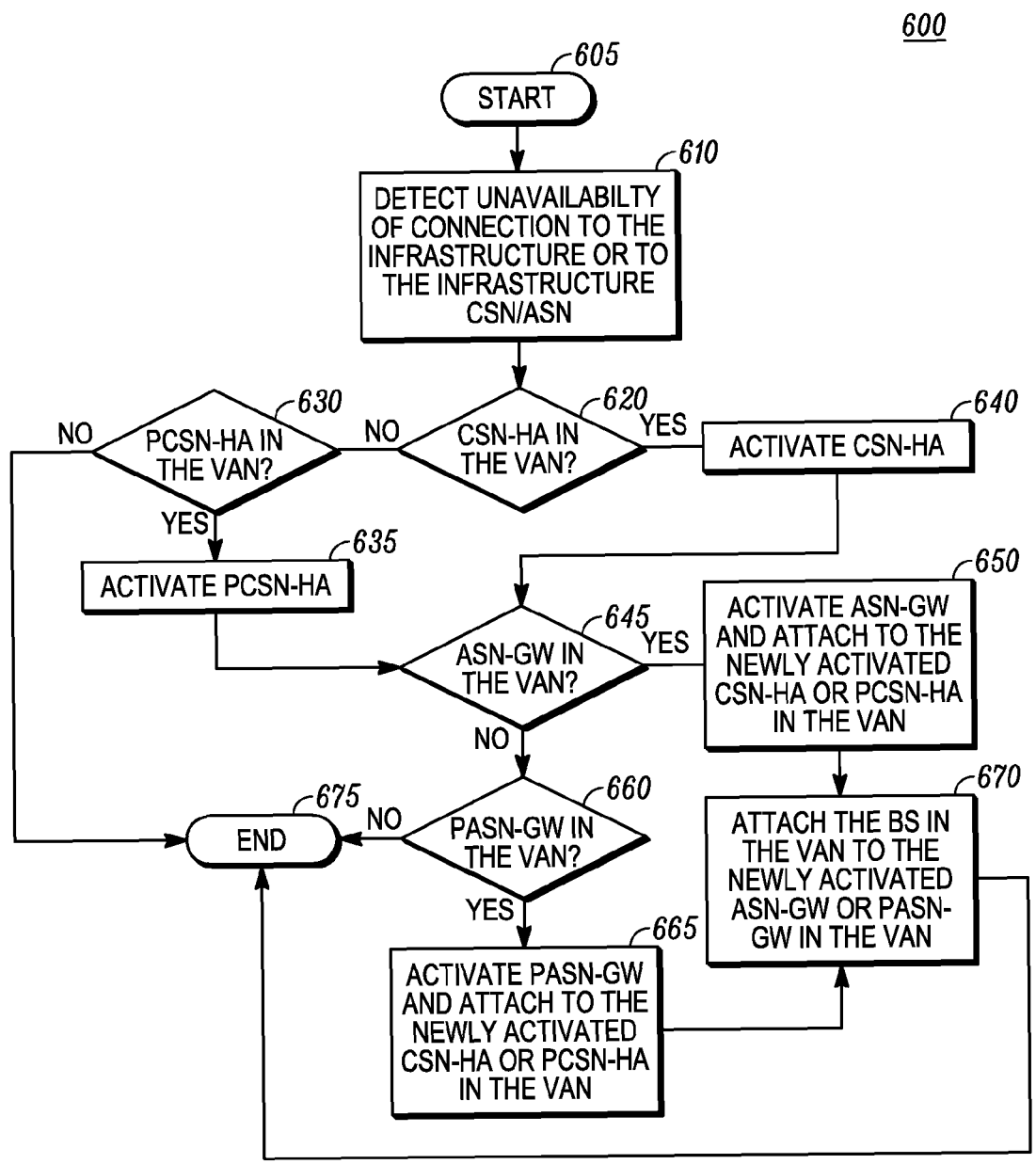
FIG. 6 is a flowchart showing an exemplary method for transitioning from connected mode to autonomous mode in accordance with some embodiments of the invention.

FIG. 6 is a flowchart showing an exemplary method 600 implemented in the VAN 440 for transitioning from connected mode to autonomous mode in accordance with some embodiments of the invention. In FIG. 6 the WiMAX network elements in the VAN 440 are activated and their downstream nodes attach or register with the newly activated nodes when the connection to the WiMAX network elements in the fixed infrastructure 420 is lost. In the present embodiment, the WiMAX network elements in the VAN 440 may be inactive during connected mode (i.e., the relevant network element functionality for the incident scene is provided by their counterpart network elements in the fixed infrastructure 420). When the connection to the fixed infrastructure 420 is lost, WiMAX network elements in the VAN, if inactive, need to be activated (i.e., provide the relevant functionality for the incident scene including announcement of their presence and other relevant parameters).

The method 600 starts at step 605, and at step 610 the WiMAX network elements in the VAN 440 such as CSN-HA 448 (if present) detect that a connection to the fixed infrastructure 420 (or to the CSN/ASN in the fixed infrastructure 420) is unavailable. In one embodiment, the MNC 442, upon detecting unavailability of connection to the infrastructure 420 (or to the infrastructure CSN/ASN), will announce the autonomous mode to WiMAX networks elements in the VAN, thus allowing them to detect that a connection to the infrastructure 420 (or to the infrastructure CSN/ASN) is unavailable.

At step 620, the method 600 determines whether there is a CSN-HA 448 in the VAN. If there is a CSN-HA 448 in the VAN, the method 600 proceeds to step 640 where the CSN-HA 448, if inactive, is activated and proceeds to step 645 where the method 600 determines whether there is an ASN-GW 446 in the VAN.

If there is not a CSN-HA 448 in the VAN, the method 600 proceeds to step 630 where it determines whether there is a PCSN-HA 452 in the VAN. If there is not a PCSN-HA 452 in the VAN, the method 600 proceeds to step 675 where the method 600 ends.

If there is a PCSN-HA 452 in the VAN, the method 600 proceeds to step 635 where the PCSN-HA 452, if inactive, is activated and proceeds to step 645 where the method 600 determines whether there is a ASN-GW 446 in the VAN.

If there is not an ASN-GW 446 in the VAN, the method 600 proceeds to step 660 where it determines whether there is a PASN-GW 454 in the VAN. If there is not a PASN-GW 454 in the VAN, the method 600 proceeds to step 675 where the method 600 ends. If there is a PASN-GW 454 in the VAN, the method 600 proceeds to step 665 where the PASN-GW 454, if inactive, is activated and attached to the CSN-HA 448 or PCSN-HA 452 in the VAN, either of which could be newly activated by method 600 or could be activated prior to method 600. The method 600 then proceeds to step 670 where the WiMAX BS 444 in the VAN 440 is attached to the ASN-GW 446 or PASN-GW 454 in the VAN, either of which could be newly activated by method 600 or could be activated prior to method 600. The method 600 proceeds to step 675 where the method 600 ends.

If there is a ASN-GW 446 in the VAN, the method 600 proceeds to step 650 where the ASN-GW 446 is activated and attached to the CSN-HA 448 or PCSN-HA 452 in the VAN. The method 600 then proceeds to step 670 where the WiMAX BS 444 in the VAN 440 is attached to the newly activated ASN-GW 446 or PASN-GW 454 in the VAN. The method 600 proceeds to step 675 where the method 600 ends.

Figure 7:
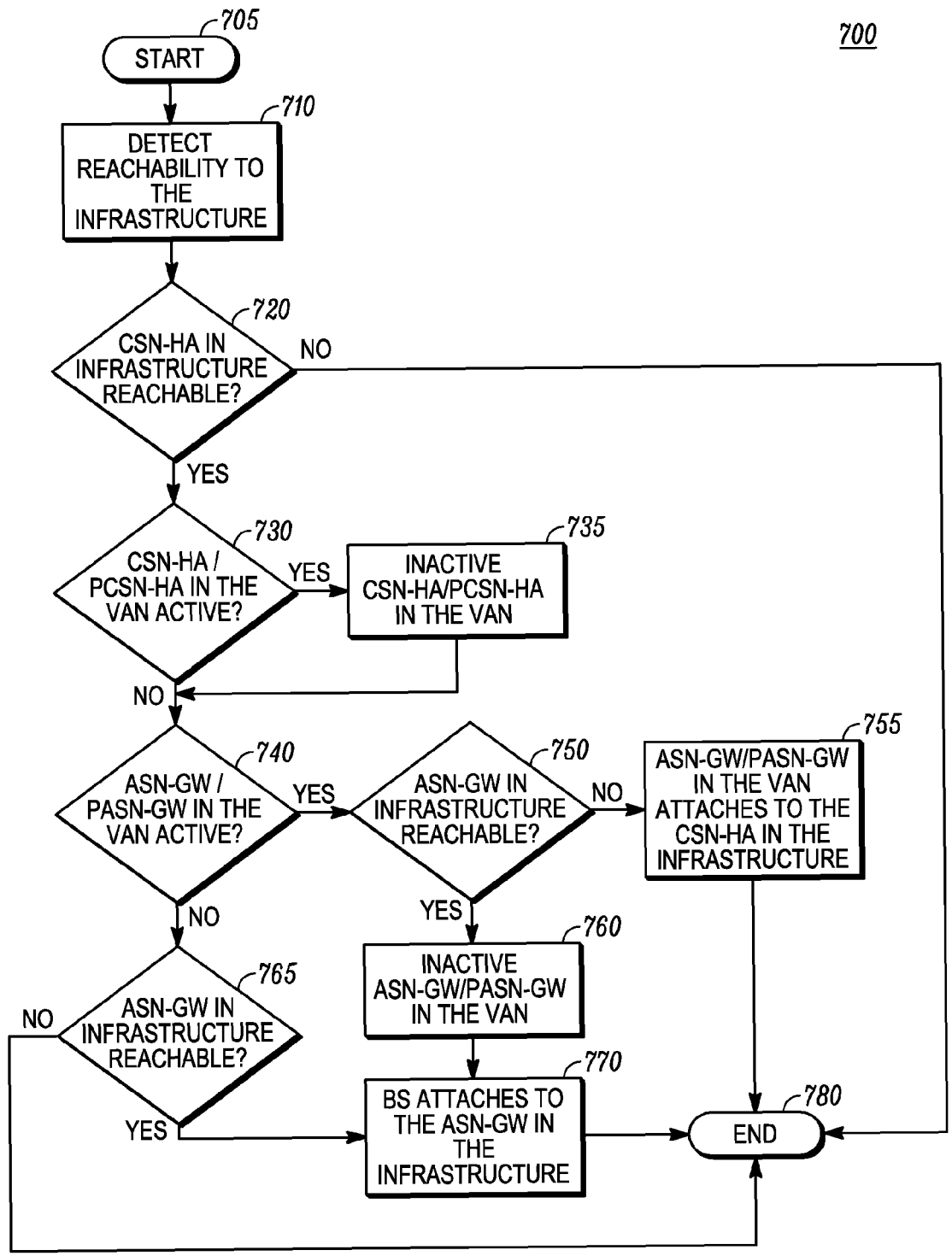
FIG. 7 is a flowchart showing an exemplary method for transitioning from autonomous mode to connected mode in accordance with some embodiments of the invention.

FIG. 7 is a flowchart showing an exemplary method 700 in the VAN 440 for transitioning from autonomous mode to connected mode in accordance with some embodiments of the invention. In FIG. 7 the active WiMAX network elements except the WiMAX BS in the VAN 440 are inactivated if their fixed infrastructure 420 counterparts are reachable and the downstream nodes in the VAN 440 attach or register with the WiMAX network elements in the fixed infrastructure 420. To inactivate a network element, one or more messages can be transmitted from a neighboring node, such as the MNC, to the given network element to deactivate it, the given network element deregistering its downstream elements, the given network element ceasing to transmit any communication. Note, however, that in another embodiment, only a subset of the active WiMAX network elements in the VAN 440 are inactivated. In yet another embodiment (not shown), none of the active WiMAX network elements in the VAN 440 are inactivated and the WiMAX-enabled nodes at the incident scene may continue to utilize the WiMAX network elements in the VAN 440 for their WiMAX-based communications. In another embodiment (not shown), all of the active WiMAX network elements in the VAN, including the WiMAX BS, are inactivated and the WiMAX-enabled nodes at the incident scene transition to using WiMAX network elements in the fixed infrastructure 420 for all its WiMAX-based communications.

The method 700 starts at step 705, and at step 710 the WiMAX network elements in the VAN 440 such as CSN-HA 448 if present in the VAN 440 detect a connection to the fixed infrastructure 420. In one embodiment, the MNC 442, upon detecting availability of connection to the infrastructure 420, will announce the connected mode to WiMAX networks elements in the VAN, thus allowing them to detect that a connection to the infrastructure 420 is available.

At step 720, the method 700 determines whether a CSN-HA 424 in the fixed infrastructure 420 is reachable. If there is not a CSN-HA 424 in the fixed infrastructure 420 that is reachable, the method 700 proceeds to step 780 where the method 700 ends. If there is a CSN-HA 424 in the fixed infrastructure 420 that is reachable, the method 700 proceeds to step 730 where it determines whether there is a CSN-HA 448 or PCSN-HA 452 in the VAN 440 that is active.

If there is a CSN-HA 448 or PCSN-HA 452 in the VAN 440 that is active, the method 700 proceeds to step 735 where it inactivates the CSN-HA 448 or PCSN-HA 452 in the VAN 440 that is active. In one possible embodiment, upon detecting reachability to the infrastructure 420 at step 710 and reachability to CSN-HA in the infrastructure 420 at step 720, the active CSN-HA/PCSN-HA in the VAN 440 can inactivate itself. If there is not a CSN-HA 448 or PCSN-HA 452 in the VAN 440 that is active, the method 700 proceeds to step 740 where the it determines whether there is a ASN-GW 446 or PASN-GW 454 in the VAN 440 that is active.

If there is an ASN-GW 446 or a PASN-GW 454 in the VAN 440 that is active, the method 700 proceeds to step 750 where it determines whether there is an ASN-GW 426 in the fixed infrastructure 420 that is reachable. If there is not a ASN-GW 426 in the fixed infrastructure 420 that is reachable, then the method 700 proceeds to step 755 where the ASN-GW 446 or PASN-GW 454 in the VAN 440 attaches to the CSN-HA 424 in the fixed infrastructure 420, and the method 700 then ends at step 780. If there is a ASN-GW 426 in the fixed infrastructure 420 that is reachable, then the method 700 proceeds to step 760 where the it inactivates the ASN-GW 446 or PASN-GW 454 in the VAN. In one possible embodiment, the active ASN-GW/PASN-GW in the VAN 440 can inactivate itself upon detecting reachability to ASN-GW in the infrastructure 420 at step 750. The method 700 then proceeds to step 770 where the WiMAX BS 444 attaches to the ASN-GW 426 in the fixed infrastructure 420 and the method 700 ends at step 780.

If there is not a ASN-GW 446 or PASN-GW 454 in the VAN 440 that is active, the method 700 proceeds to step 765 where the WiMAX BS 444 determines whether there is a ASN-GW 426 in the fixed infrastructure 420 that is reachable. If there is not an ASN-GW 426 in the infrastructure 420 that is reachable, then the method 700 ends at step 780. If there is an ASN-GW 426 in the infrastructure 420 that is reachable, then the method 700 proceeds to step 770 where the WiMAX BS 444 attaches to the ASN-GW 426 in the infrastructure 420 and the method 700 ends at step 780.

While FIG. 6 and FIG. 7 show some examples of policies that trigger the transition from one mode to another, this invention does not preclude other types of trigger policies for such transitions. Further, even in the connected mode, other policies can be used that would determine whether the proxies PCSN-HA 452, PASN-GW 454 are to be used despite an available connection to their heavy weight counterparts. For example, such policies could be applied on a per user basis or on a per-application basis. In one embodiment, during bypass mode, when the two end points of a communication link are in the same incident scene, even in the connected mode, the proxies PCSN-HA 452, PASN-GW 454 or the CSN-HA, ASN-GW in the VAN 440 can be used instead of their heavy weight counterparts in the fixed infrastructure 420. Motivations for bypassing the infrastructure 420 WiMAX elements include, for example, avoiding/reducing congestion over the links connecting the infrastructure 420 elements, or as a way of load balancing between the infrastructure 420 and VAN networks.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A system for providing mobile wireless broadband coverage, the system comprising:
 a Wireless Wide Area Broadband (WWAB) fixed infrastructure comprising a first set of WWAB network elements;
 a Mobility Management Server (MMS) coupled to the WWAB fixed infrastructure;
 a Vehicular Area Network (VAN) comprising a Mobile Network Controller (MNC) coupled to a second set of WWAB network elements, the second set of WWAB network elements enabling connection to the WWAB fixed infrastructure even in the event of absence of a roaming agreement with or a lack of access to a Network Access Provider in the WWAB fixed infrastructure; and
 a mobility protocol tunnel coupled between the MMS and the MNC to make mobility of the second set of WWAB network elements transparent to the first set of WWAB network elements in the WWAB fixed infrastructure,
 wherein the VAN is operable to support an autonomous mode in which the VAN provides communications because the first set of WWAB network elements is unavailable, a bypass mode in which the VAN provides communications despite the first set of WWAB network elements being available, and a connected mode in which the fixed infrastructure provides communications for the VAN independent of availability of the second set of WWAB network elements.

2. A system according to claim 1, wherein the Mobility Management Server (MMS) comprises a Mobile Virtual Private Network (MVPN) server, the mobility protocol tunnel comprises a Mobile Internet Protocol (IP) Virtual Private Network (MVPN) tunnel which couples the Mobile Network Controller (MNC) in the VAN to the WWAB fixed infrastructure via the MVPN server, and the MVPN tunnel comprises:
 a first endpoint comprising the MVPN Server; and
 a second endpoint comprising the Mobile Network Controller (MNC) in the VAN.

3. A system according to claim 1,
 wherein the Wireless Wide Area Broadband (WWAB) fixed infrastructure comprises a Worldwide Interoperability for Microwave Access (WiMAX) infrastructure,
 wherein the WWAB network elements comprise WiMAX network elements, the mobility protocol tunnel makes mobility of the second set of WiMAX network elements transparent to the first set of WiMAX network elements in the fixed infrastructure,
 wherein the second set of WiMAX network elements comprises at least one WiMAX base station (BS), and
 wherein the system further comprises at least one WiMAX-enabled mobile station (MS), wherein the WiMAX-enabled mobile station (MS) connects to the WiMAX BS, and wherein the MNC connects the second set of WiMAX network elements to the WiMAX fixed infrastructure when the WiMAX fixed infrastructure is reachable.

4. A system according to claim 3, wherein the second set of WiMAX network elements further comprises an Access Service Network (ASN) Gateway (ASN-GW) and the WiMAX fixed infrastructure does not contain ASN-GW coupled to the second set of WiMAX network elements.

5. A system according to claim 4, wherein the second set of WiMAX network elements further comprises a Connectivity Service Network Home Agent (CSN-HA) so that the VAN is capable of operating in an autonomous mode and the WiMAX fixed infrastructure does not contain a CSN-HA coupled to the second set of WiMAX network elements.

6. A system according to claim 3, wherein
 the WiMAX fixed infrastructure contains neither a Connectivity Service Network Home Agent (CSN-HA) nor an Access Service Network (ASN) Gateway (ASN-GW) that are coupled to the second set of WiMAX network elements, and
 the second set of WiMAX network elements further comprises:
  a Proxy Connectivity Service Network Home Agent (PCSN-HA); and
  a Proxy Access Service Network Gateway (PASN-GW), so that the VAN is capable of operating in an autonomous mode in which the VAN provides communications because the first set of network elements are unavailable.

7. A system according to claim 3,
 wherein the WiMAX fixed infrastructure further comprises a Connectivity Service Network Home Agent (CSN-HA) but does not contain an Access Service Network (ASN) Gateway (ASN-GW) coupled to the second set of WiMAX network elements; and
 wherein the second set of WiMAX network elements further comprise:
  an Access Service Network (ASN) Gateway (ASN-GW); and
  a Proxy Connectivity Service Network Home Agent (PCSN-HA) that provides proxy functionality for the CSN-HA in the WiMAX fixed infrastructure.

8. A system according to claim 3,
 wherein the WiMAX fixed infrastructure further comprises:
  a Connectivity Service Network Home Agent (CSN-HA); and
  an Access Service Network (ASN) Gateway (ASN-GW); and
 wherein the second set of WiMAX network elements further comprise:
  a Proxy Connectivity Service Network Home Agent (PCSN-HA) that provides proxy functionality for the CSN-HA in the WiMAX fixed infrastructure; and
  a Proxy Access Service Network Gateway (PASN-GW) that provides proxy functionality for the ASN-GW in the WiMAX fixed infrastructure.

9. A Vehicular Area Network (VAN) comprising:
 a Mobile Network Controller (MNC); and
 a first set of Wireless Wide Area Broadband (WWAB) network elements comprising at least one WWAB base station (BS), the WWAB network elements enabling connection to a WWAB fixed infrastructure even in the event of absence of a roaming agreement with or a lack of access to a Network Access Provider in the WWAB fixed infrastructure,
 wherein the VAN is operable to support an autonomous mode in which the VAN provides communications because WWAB network elements of the fixed infrastructure are unavailable, a bypass mode in which the VAN provides communications despite the WWAB network elements of the fixed infrastructure being available, and a connected mode in which the fixed infrastructure provides communications for the VAN independent of availability of the first set of WWAB network elements.

10. A VAN according to claim 9, wherein:
 a mobility protocol tunnel couples the MNC to a second set of WWAB network elements in the fixed infrastructure via a Mobility Management Server (MMS) to make mobility of the first set of WWAB network elements in the VAN transparent to the second set of WWAB networks elements in the fixed infrastructure,
the Wireless Wide Area Broadband (WWAB) fixed infrastructure comprises a Worldwide Interoperability for Microwave Access (WiMAX) infrastructure, the WWAB network elements comprise WiMAX network elements, and the mobility protocol tunnel makes mobility of the first set of WiMAX network elements transparent to the second set of WiMAX network elements in the fixed infrastructure,
the first set of WiMAX network elements comprise at least one WiMAX base station (BS); and
wherein the system further comprises:
at least one WiMAX-enabled mobile station (MS), wherein the WiMAX-enabled mobile station (MS) connects to the WiMAX BS, and wherein the MNC connects the first set of WiMAX network elements to the WiMAX fixed infrastructure when the WiMAX fixed infrastructure is reachable.

11. A VAN according to claim 10, wherein the first set of WiMAX network elements further comprises an Access Service Network (ASN) Gateway (ASN-GW) and the WiMAX fixed infrastructure does not contain an ASN-GW coupled to the first set of WiMAX network elements.

12. A VAN according to claim 10, wherein the first set of WiMAX network elements further comprises a Connectivity Service Network Home Agent (CSN-HA) so that the VAN is capable of operating in an autonomous mode and the WiMAX fixed infrastructure does not contain a CSN-HA coupled to the first set of WiMAX network elements.

13. A VAN according to claim 10, wherein
the WiMAX fixed infrastructure contains neither a Connectivity Service Network Home Agent (CSN-HA) nor an Access Service Network (ASN) Gateway (ASN-GW) that are coupled to the first set of WiMAX network elements, and
the first set of WiMAX network elements further comprises:
a Proxy Connectivity Service Network Home Agent (PCSN-HA); and
a Proxy Access Service Network Gateway (PASN-GW), so that the VAN is capable of operating in an autonomous mode because the second set of network elements are unavailable.

14. A VAN according to claim 10,
wherein the WiMAX fixed infrastructure further comprises a Connectivity Service Network Home Agent (CSN-HA) but does not contain an Access Service Network (ASN) Gateway (ASN-GW) coupled to the first set of WiMAX network elements; and
wherein the first set of WiMAX network elements further comprises:
an Access Service Network (ASN) Gateway (ASN-GW); and
a Proxy Connectivity Service Network Home Agent (PCSN-HA) that provides proxy functionality for the CSN-HA in the WiMAX fixed infrastructure.

15. A VAN according to claim 10,
wherein the WiMAX fixed infrastructure further comprises:
a Connectivity Service Network Home Agent (CSN-HA); and
an Access Service Network (ASN) Gateway (ASN-GW); and
wherein the first set of WiMAX network elements further comprises:
a Proxy Connectivity Service Network Home Agent (PCSN-HA) that provides proxy functionality for the CSN-HA in the WiMAX fixed infrastructure; and
a Proxy Access Service Network Gateway (PASN-GW) that provides proxy functionality for the ASN-GW in the WiMAX fixed infrastructure.

16. A method for providing mobile wireless broadband coverage in a Worldwide Interoperability for Microwave Access (WiMAX)-enabled mobile station (MS) containing a first set of WiMAX network elements in a Vehicular Area Network (VAN), the method comprising:
determining whether at least one of a second set of WiMAX network elements in a Wireless Wide Area Broadband (WWAB) fixed infrastructure to which the first set of network elements was attached in a connected mode has become unavailable;
if at least one of the second set of network elements is determined to be unavailable, transitioning operation of the VAN to an autonomous mode by:
determining which of the second set of network elements has become unavailable; and
activating elements in the first set of network elements whose functionality duplicates that of the unavailable elements in the second set of network elements, and
transitioning from the autonomous mode to the connected mode when the unavailable elements are determined to have again become available by attaching the first set of network elements to the newly available elements in the second set of network elements.

17. A method according to claim 16, wherein:
determining which of the second set of network elements has become unavailable comprises detecting whether a Connectivity Service Network Home Agent (CSN-HA) in the fixed infrastructure has become unavailable, and
the activating comprises:
detecting whether the first set of network elements includes a CSN-HA or, if not, a Proxy Connectivity Service Network Home Agent (PC SN-HA) that provides proxy functionality for the CSN-HA in the fixed infrastructure, and
activating, if inactive, the detected CSN-HA or PC SN-HA in the first set network elements.

18. A method according to claim 17, wherein the activating further comprises:
detecting whether the first set of network elements includes an Access Service Network (ASN) Gateway (ASN-GW) or, if not, a Proxy Access Service Network Gateway (PASN-GW) that provides proxy functionality for an ASN-GW in the fixed infrastructure, and
if the ASN-GW or PASN-GW is detected in the first set network elements:
activating, if inactive, the detected ASN-GW or PASN-GW,
attaching the activated ASN-GW or PASN-GW to the activated CSN-HA or PCSN-HA, and
attaching a base station in the VAN to the activated ASN-GW or PASN-GW.

19. A method according to claim 16, wherein the transitioning further comprises:
detecting whether a previously unavailable Connectivity Service Network Home Agent (CSN-HA) in the fixed infrastructure has become available,
if the CSN-HA has become available, detecting whether a previously unavailable Access Service Network (ASN) Gateway (ASN-GW) in the fixed infrastructure has become available, and if the ASN-GW is available, attaching a base station in the VAN to the available ASN-GW and, if the ASN-GW is not available, attaching an ASN-GW or a Proxy Access Service Network Gateway (PASN-GW) in the VAN to the available CSN-HA.

20. A method according to claim 19, wherein the transitioning further comprises deactivating a CSN-HA in the VAN if the CSN-HA in the fixed infrastructure has become available and deactivating the ASN-GW or PASN-GW in the VAN if the ASN-GW in the fixed infrastructure has become available.

21. A method according to claim 16, further comprising using a bypass mode in which a Proxy Connectivity Service Network Home Agent (PCSN-HA) or a Connectivity Service Network Home Agent (CSN-HA) and a Proxy Access Service Network Gateway (PASN-GW) or an Access Service Network Gateway (ASN-GW) in the VAN instead of a CSN-HA and an ASN-GW in the fixed infrastructure even though the CSN-HA and ASN-GW in the fixed infrastructure are available when end points of a communication link are in the same incident scene.

* * * * *

UNITED STATES PATENT AND TRADEMARK OFFICE
CERTIFICATE OF CORRECTION

| | | |
|---|---|---|
| PATENT NO. | : 8,144,672 B2 | Page 1 of 1 |
| APPLICATION NO. | : 11/680394 | |
| DATED | : March 27, 2012 | |
| INVENTOR(S) | : Pandey et al. | |

It is certified that error appears in the above-identified patent and that said Letters Patent is hereby corrected as shown below:

On the title page, item (52), under "U.S. Cl." in Column 1, Line 1, delete "455/553.143;" and insert -- 455/553.1; --, therefor.

In Fig. 6, Sheet 6 of 7, for Tag "610", in Line 1, delete "UNAVAILABILTY" and insert -- UNAVAILABILITY --, therefor.

In Column 9, Line 64, delete "WIMAX" and insert -- WiMAX --, therefor.

In Column 9, Line 67, delete "WIMAX" and insert -- WiMAX --, therefor.

In Column 10, Line 1, delete "WIMAX" and insert -- WiMAX --, therefor.

In Column 17, Line 32, in Claim 2, delete "(IP)" and insert -- (MIP) --, therefor.

In Column 17, Lines 32-33, in Claim 2, delete "Virtual Private Network" and insert -- Mobile Virtual Private Network --, therefor.

In Column 20, Line 39, in Claim 17, delete "(PC SN-HA)" and insert -- (PCSN-HA) --, therefor.

In Column 20, Lines 42-43, in Claim 17, delete "PC SN-HA" and insert -- PCSN-HA --, therefor.

Signed and Sealed this
Eighth Day of January, 2013

David J. Kappos
*Director of the United States Patent and Trademark Office*